June 7, 1966  A. E. BATES ETAL  3,254,862
HOSE FOLDER

Filed Nov. 29, 1963  2 Sheets-Sheet 1

INVENTORS
ARTHUR E. BATES
RICHARD H. BATES

Agent

June 7, 1966  A. E. BATES ETAL  3,254,862
HOSE FOLDER

Filed Nov. 29, 1963  2 Sheets-Sheet 2

INVENTORS
ARTHUR E. BATES
RICHARD H. BATES

Ernest E Carver
Agent 3,254,862
HOSE FOLDER
Arthur E. Bates P.O. Box 1365, Terrace, British Columbia, Canada, and Richard H. Bates, P.O. Box 183, Telkwa, British Columbia, Canada
Filed Nov. 29, 1963, Ser. No. 326,758
2 Claims. (Cl. 242—86)

Our invention relates to an apparatus for use in coiling flexible ribbon-like material, practicularly fire hose.

The objects of the invention are to provide means for imparting to the winding drum of a hose folder, a motion which is a combination of a rotating, an orbiting and a wobbling movement whereby a length of fire hose or the like is wound into a particular configuration. It has been found that hose rolled in this maner forms a neat, compact bundle convenient for both storing and transporting and that the rolled hose lengths are readily connected together prior to use and may be run out when so connected without danger of kinking or entangling.

Still further objects are to provide this particular drum motion with a minimum of moving parts which may be either hand or power driven, to provide means whereby the rolled hose is easily removed from the winding drum and to provide means whereby the structure is quickly and easily adjusted to accommodate hose of varying flattened widths.

Referring to the drawings.

Figures 1, 2:
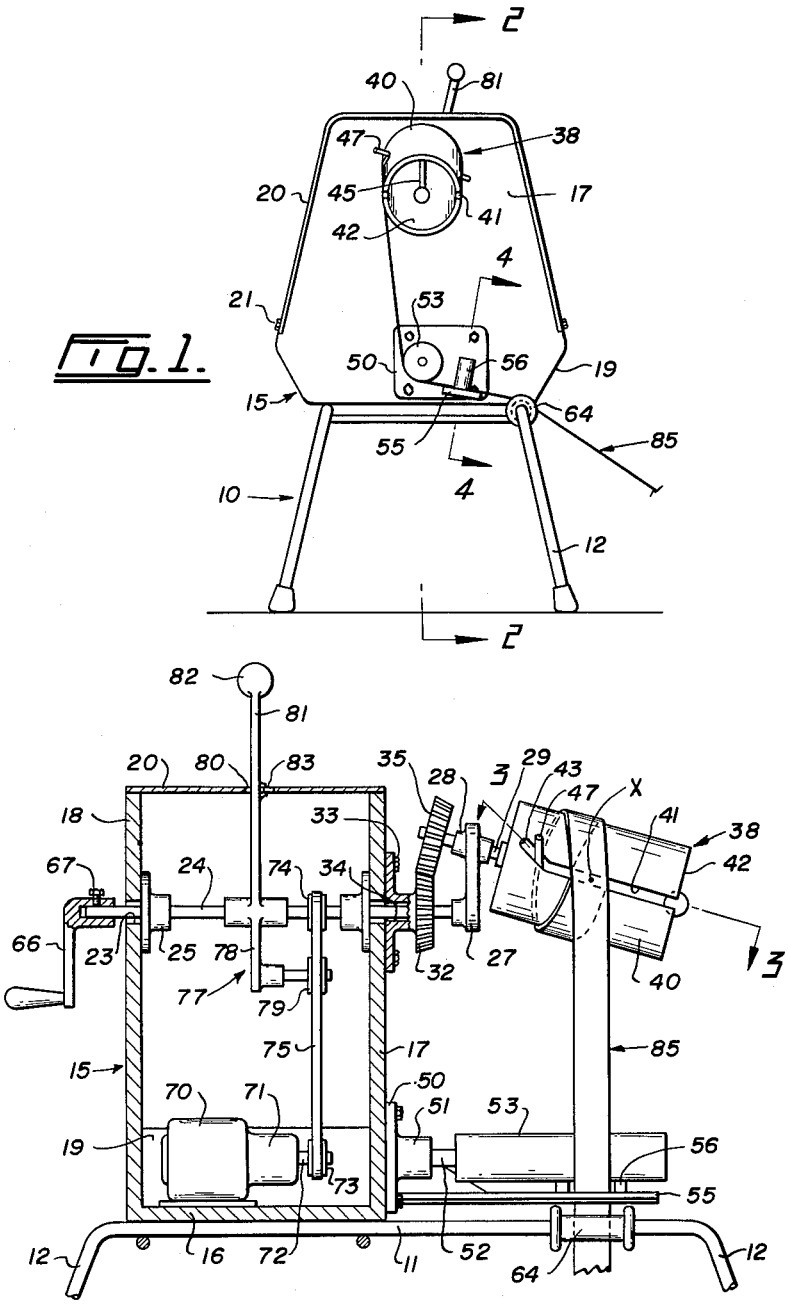
FIGURE 1 is a front elevation of the invention.
FIGURE 2 is an enlarged vertical section taken on the line 2—2 of FIG. 1.

The hose folder is mounted on a stand 10 of lightweight tubular construction, the stand including a pair of side members 11 which are downwardly turned to provide legs 12.

A housing 15 is supported on the stand 10 and is suitably secured thereto. This housing has a bottom wall 16, a front wall 17, a rear wall 18 and side walls 19 which extend only a short distance above said bottom wall. An inverted U-shaped cowling 20 encloses the upper part of the housing 15 and this cowling may be removably secured to the walls 17 and 18 by means of bolts 21.

Extending through openigs 23 in the front and rear walls of the houisng is a horizontal shaft 24. This main shaft of the hose folder is journalled in bearings 25 secured to inner faces of the walls 17 and 18. Secured to one end of the shaft 24 is a short length crank 27 which carries a sleeve bearing 28 on its outer end. The sleeve bearing is fitted with a spindle 29, the spindle being supported so that its axis is disposed at an acute angle to the axis of the shaft 24, preferably 15°.

A bevel gear 32 is fastened to the outer face of the housing wall 17 by bolts 33, this gear having a central opening 34 through which the shaft 24 extends. Meshing with the gear 32 is a second bevel gear 35 which is keyed to the adjacent end of the spindle 29. It will be noted that the two bevel gears are of the same diameter and therefore the spindle 29 is rotated twice as its planet gear 35 is moved once around the sun gear 32 in response to a single revolution of the main shaft 24.

The spindle 29 is fitted with a winding drum 38 which is in an open-ended cylinder having an inner end wall 39 and a peripheral wall 40. The wall 40 has two diametrically opposed slots 41 which extend inwardly from the open end 42 of the winding drum. Near the end wall 39, the slots 41 are provided with extensions 43 which, preferably, are disposed at a slight angle to the longituidui-nal axes of the slots. The drum 38 is adapted to be fitted with a T-shaped extractor 45 which has a handle 46 and a cross bar 47. This extractor is inserted into the slots 41 with the bar 47 normally lodged in the slot extensions and the handle 46 aligned with the spindle 29. In this position the ends of the cross bar project some few inches beyond the outer surface of the wall 40 and the handle is easily accessible from the open end 42 of the winding drum.

At a point directly below the shaft 24, the front wall 17 of the housing is fitted with a plate 50 which carries a socket 51. A horizontally disposed axle 52 is supported in this socket and mounted on the axle is a roller 53 which projects outwardly a distance substantially equal to the projection of the winding drum 38.

Figure 4:
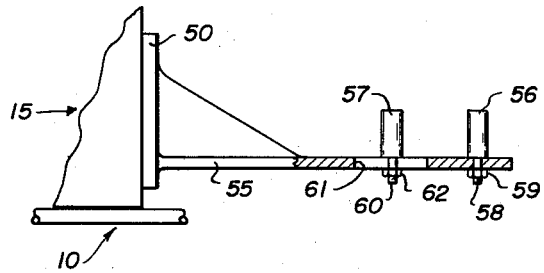
FIGURE 4 is an enlarged vertical section taken on the line 4—4 of FIG. 1.

The plate 50 also supports a bracket 55 which extends parallel to the roller and is disposed slightly below and to one side of said roller. As shown best in FIG. 4, the bracket serves to support two spaced apart hose guides 56 and 57. The guide 56 is secured in fixed position by means of a bolt 58 and nut 59. The guide 57, however, has a bolt 60 which extends through a slot 61 formed in the bracket and this bolt is engaged by a nut 62. Thus the spacing between the guides may be adjusted according to the width of the hose which is to be fed to the folding machine. A fairlead 64 is mounted on one of the side members 11 to support the hose as it moves through the guides.

The main shaft 24 projects beyond the rear wall 18 of the houisng and this projecting end of the shaft is squared off to receive a hand crank 66. Preferably the crank is secured to the shaft end by means of a clamping bolt 67 so that said crank may readily be removed if not required.

Mounted on the bottom wall 16 of the housing is an electric motor 70 which is fitted with a reducer 71. The driven shaft 72 of the reducer is fitted with a pulley 73 and another pulley 74 is affixed to the shaft 24. A belt 75 connects the two pulleys 73 and 74, the belt being loose fitting so that normally it will not transmit drive until its slack is taken up by means of a tightenig device 77. The belt tightener 77 consists of a bell crank which is rockingly mounted on the main shaft 24. The arm 78 of this crank carries a pulley 79 over which one of the runs of the belt 75 is trained. A slot 80 is formed in the top of the cowling 20 and the other arm 81 of the device projects through this slot where it is fitted with an operating knob 82. One side edge of the slot 80 is provided with notches 83 which are adapted to be selectively engaged by the arm 81 to apply the required driving tension to the belt 75.

The folder is primarily intended for use in rolling up fire hose, a single length of which is indicated by the numeral 85. Such a hose length is fitted with the usual couplings 86 and 87 for connection to other similar hose lengths. To ready the folder for the rolling operation the extractor 45 is fitted to the drum and the guide 57 is a set distance from the fixed guide, slightly greater than the width of the flattened hose. With the hose roughly laid out to the right of the folder as viewed in FIG. 1, the coupling 86 end of said hose is drawn over the fairlead 64, through the guides and around the roller 53 up to the winding drum. The hose is then threaded into one of the slots 41 so that the coupling 86 is supported by the inner surface of the wall 40 at a point X approximately mid-way of the length of the winding drum.

Assuming that the motor 70 is to be used for the winding operation, the operator closes a switch, not shown, to energize the electric motor and adjusts the tightener 77 to drive. The motor 70 drives the shaft 24 in a clockwise direction, as viewed in FIG. 1 and obviously rotates the winding drum in the same direction. As the drum rotates it orbits around the main shaft and at the same time undergoes a wobbling motion. This particular movement of the drum results in the hose being wound first to one side of the point X and then to the other side with one complete wrap or convolution being made on each side of said mid-point. At the completion of each turn the hose passes over the mid-point X before commencing the next turn with the maximum spacing between the turns being substantially equal to the width of the hose being rolled.

Figure 5:
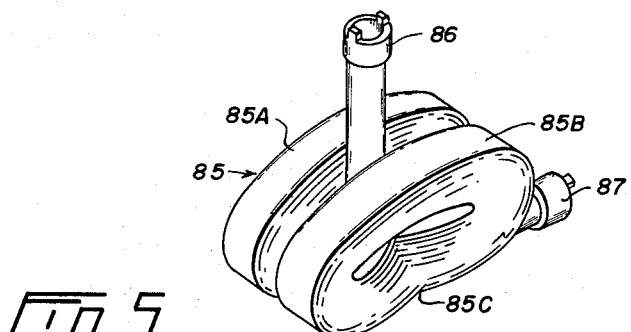
FIGURE 5 is a perspective view of a length of fire hose rolled by the present folder.

This method of winding continues until the entire length of the hose is wrapped around the drum whereupon the motor is stopped. It will then be found that the hose has been rolled on the drum in the form of two closely spaced rolls 85A and 85B which are cross connected to one another as at 85C, see FIG. 5. The operator draws the rolled hose off the winding drum using the extractor 45 and lays it down with the coupling 87 in contact with the supporting surface. This results in the two rolls 85A and 85B flattening out to some extent and when the coupling 86 is pulled up vertically between the rolls the hose length is ready for storage. When the hose is again required for use it will be found that the couplings can conveniently be connected to the appropriate couplings of similarly rolled lengths of hose and the entire hose can be run out without becoming twisted or snarled.

Figures 3, 6:
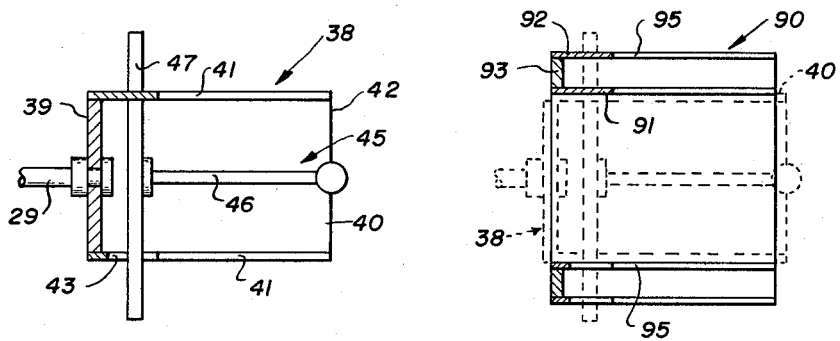
FIGURE 3 is a sectional plan taken on the line 3—3 of FIG. 2.
FIGURE 6 is a sectional plan of an adapter fitted to the winding drum.

Referring now to FIG. 6, the numeral 90 indicates an adapter for the winding drum 38. The adapter is provided with concentric peripheral walls 91 and 92 which are connected together by an annular end wall 93. The adapter 90 is designed to be slipped over the winding drum 38 with the wall 91 snugly fitting the drum wall 40. Both the walls 91 and 92 have slots 95 which conform to the slots 41 of the winding drum and which register therewith when the adapter is fitted to the drum. When so fitted the bar 47 of the extractor extends the several drum and adapter slots and projects beyond the outer surface of the wall 92.

The adapter is used when exceptionally wide hose or other ribbon-like material is to be rolled by the hose folder. When fitted to the drum as above described the adapter, in effect, increases the stroke of the crank 27. This in turn provides a wider spacing between the subsequently formed rolls 85A and 85B so as to compensate for the increased width of the material being rolled.

What we claim is:

1. In a hose folder, the combination of a rotatably mounted main shaft, a crank on one end of the main shaft, a spindle journalled in the outer end of the crank with its axis disposed at an acute angle to the axis of the main shaft, a drive train operatively connecting the spindle to a fixed part of the hose folder whereby said spindle is rotated in response to rotation of the main shaft, a winding drum on the spindle, said winding drum having a peripheral wall and an open end, said peripheral wall having a pair of diametrically opposed slots therein extending from the open end of the drum, an extractor having a cross bar normally lodged in the slots with its ends projecting beyond the peripheral wall of the winding drum and means for rotating the main shaft.

2. In a hose folder as claimed in claim 1, and an adapter attachable to the winding drum, said adapter having a peripheral wall provided with a pair of slots which register with the winding drum pair of slots, said cross bar of the extractor projecting through the pairs of slots and keying the adapter to the winding drum.

References Cited by the Examiner

UNITED STATES PATENTS

| 1,141,449 | 6/1915 | Eppler | 242—67.1 |
| 1,915,632 | 6/1933 | Marks | 242—86 |
| 3,033,060 | 5/1962 | Nemec | 242—84.21 X |

FOREIGN PATENTS

| 884,215 | 4/1943 | France. |
| 894,624 | 3/1944 | France. |

MERVIN STEIN, *Primary Examiner.*

STANLEY N. GILREATH, W. S. BURDEN,
*Assistant Examiners.*